United States Patent
Arisi et al.

(10) Patent No.: US 11,180,998 B2
(45) Date of Patent: Nov. 23, 2021

(54) AIRFOIL WITH SKINCORE PASSAGE RESUPPLY

(71) Applicant: United Technologies Corporation, Farmington, CT (US)

(72) Inventors: Allan N. Arisi, Manchester, CT (US); Dominic J. Mongillo, West Hartford, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 204 days.

(21) Appl. No.: 16/532,594

(22) Filed: Aug. 6, 2019

(65) Prior Publication Data
US 2020/0149416 A1 May 14, 2020

Related U.S. Application Data (60) Provisional application No. 62/758,096, filed on Nov. 9, 2018.

(51) Int. Cl.
*F01D 5/18* (2006.01)
*F04D 29/58* (2006.01)

(52) U.S. Cl.
CPC .............. *F01D 5/189* (2013.01); *F01D 5/187* (2013.01); *F04D 29/582* (2013.01); *F05D 2220/32* (2013.01); *F05D 2240/81* (2013.01)

(58) Field of Classification Search
CPC .......... F01D 5/187; F01D 5/189; F01D 5/186; F05D 2240/81; F05D 2220/32
See application file for complete search history.

(56) References Cited

U.S. PATENT DOCUMENTS

| | | | | |
|---|---|---|---|---|
| 5,813,835 A | * | 9/1998 | Corsmeier | F01D 5/186 415/115 |
| 7,001,141 B2 | | 2/2006 | Cervenka | |

(Continued)

FOREIGN PATENT DOCUMENTS

| | | |
|---|---|---|
| EP | 1808574 | 7/2007 |
| EP | 1865151 | 12/2007 |
| EP | 1882819 | 1/2008 |

OTHER PUBLICATIONS

European Search Report for European Patent Application No. 19207526.5 completed May 12, 2020.

*Primary Examiner* — Eldon T Brockman
(74) *Attorney, Agent, or Firm* — Carlson, Gaskey & Olds, P.C.

(57) ABSTRACT

An airfoil includes an airfoil section that has an airfoil wall that defines a leading end, a trailing end, and first and second sides that join the leading end and the trailing end. The first and second sides span in a longitudinal direction between first and second ends, and the airfoil wall circumscribes an internal core cavity. First and second platforms are attached, respectively, with the first and second ends. A cooling passage circuit extends at least in the first platform and the airfoil section. The cooling passage circuit includes a first plenum in the first platform adjacent at least the first side of the airfoil wall, a hybrid skin core passage embedded in the first side of the airfoil wall and that extends longitudinally, and a resupply passage that connects the first plenum with the hybrid skin core passage.

20 Claims, 8 Drawing Sheets

(56) References Cited

U.S. PATENT DOCUMENTS

| | | | |
|---|---|---|---|
| 7,513,744 B2* | 4/2009 | Cunha | F01D 5/187 |
| | | | 416/92 |
| 7,553,131 B2* | 6/2009 | Cunha | F01D 5/186 |
| | | | 415/115 |
| 7,600,966 B2* | 10/2009 | Devore | F01D 5/186 |
| | | | 415/115 |
| 7,625,172 B2 | 12/2009 | Walz et al. | |
| 2007/0166161 A1* | 7/2007 | Devore | F01D 5/189 |
| | | | 416/97 R |
| 2008/0019839 A1* | 1/2008 | Cunha | F01D 5/187 |
| | | | 416/96 R |
| 2016/0376896 A1 | 12/2016 | Spangler et al. | |

* cited by examiner

AIRFOIL WITH SKINCORE PASSAGE RESUPPLY

CROSS-REFERENCE TO RELATED APPLICATION

This application claims priority to U.S. Provisional Application No. 62/758,096 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second sides that join the leading end and the trailing end. The first and second sides span in a longitudinal direction between first and second ends. The airfoil wall circumscribes an internal core cavity. First and second platforms are attached, respectively, with the first and second ends. A cooling passage circuit extends at least in the first platform and the airfoil section. The cooling passage circuit has a first plenum in the first platform. The first plenum extends adjacent at least the first side of the airfoil wall. A hybrid skin core passage is embedded in the first side of the airfoil wall and extends longitudinally. A resupply passage connects the first plenum with the hybrid skin core passage.

In a further embodiment of any of the foregoing embodiments, the resupply passage opens into a forward portion of the hybrid skin core passage.

In a further embodiment of any of the foregoing embodiments, the resupply passage opens into a forward one-fourth of the hybrid skin core passage.

In a further embodiment of any of the foregoing embodiments, the resupply passage opens longitudinally.

In a further embodiment of any of the foregoing embodiments, the resupply passage includes a first resupply passage section that opens to the hybrid skin core passage and a second resupply passage portion that includes a blind aperture.

In a further embodiment of any of the foregoing embodiments, the resupply passage is adjacent a rib in the airfoil section.

In a further embodiment of any of the foregoing embodiments, the cooling passage circuit, in addition to the resupply passage, incudes a main supply passage connecting the first plenum with the hybrid skin core passage.

In a further embodiment of any of the foregoing embodiments, the resupply passage has a first cross-sectional area and the main supply passage has a second cross-sectional area that is greater than the first cross-sectional area.

In a further embodiment of any of the foregoing embodiments, the cooling passage circuit includes a second plenum in the second platform and a connector passage connecting the hybrid skin core passage with the second plenum.

In a further embodiment of any of the foregoing embodiments, the hybrid skin core passage includes a plurality of longitudinally-elongated ribs that define longitudinally-elongated passages there between.

In a further embodiment of any of the foregoing embodiments, the first side is a suction side and the second side is a pressure side.

A gas turbine engine according to an example of the present disclosure includes a turbine section that has an airfoil as in any of the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
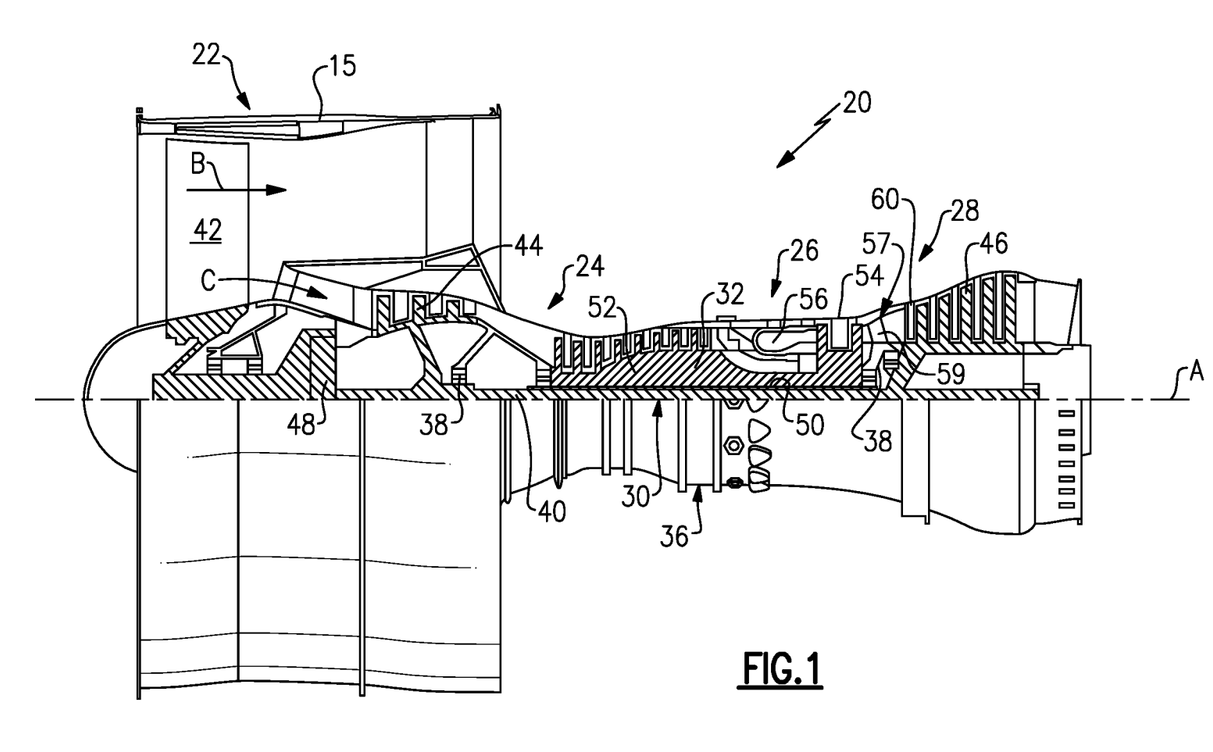
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
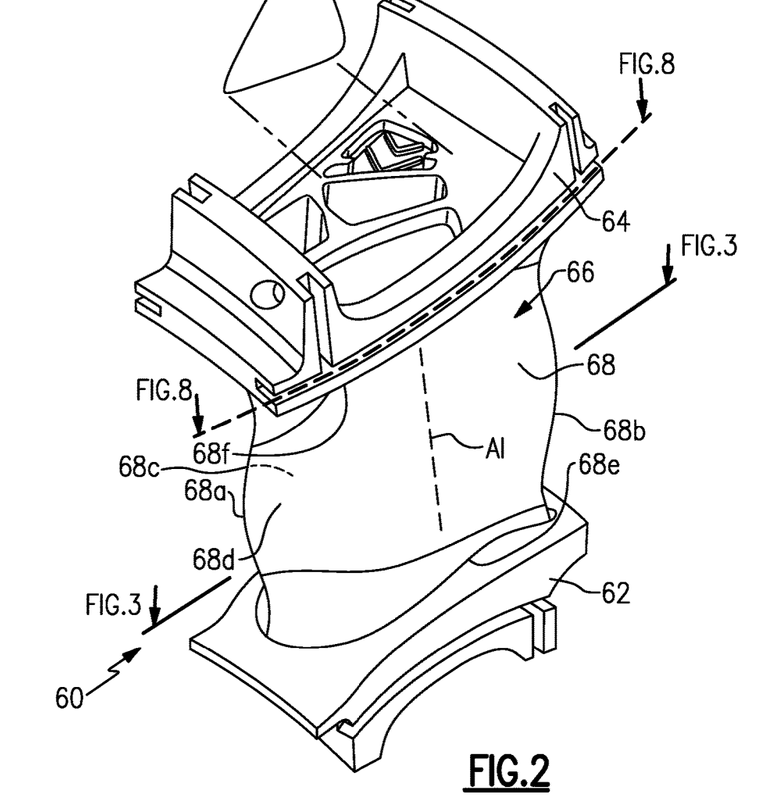
FIG. 2 illustrates an airfoil of the engine of FIG. 1.

FIG. 2 illustrates a representative example of a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades and turbine vanes in other locations than shown.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

Figure 3:
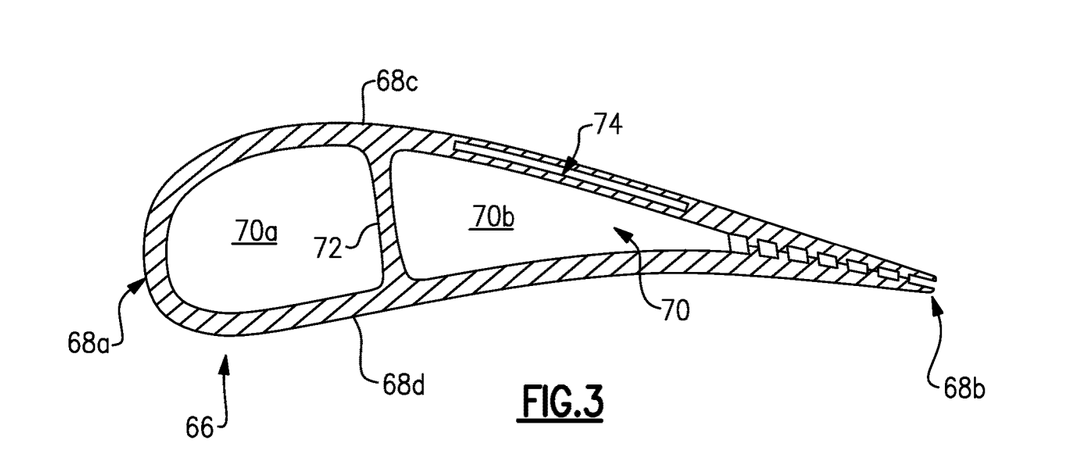
FIG. 3 illustrates a sectioned view of the airfoil of FIG. 2.

FIG. 3 illustrates airfoil section 66 which includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. The airfoil section 66 may include a rib 72 that partitions the cavity 70 into a forward core cavity 70a and an aft core cavity 70b.

The airfoil section 66 further includes a hybrid skin core passage 74 embedded in the first side 68c. The hybrid skin core passage 74 is a cooling passage network and may also be referred to as a skin core cooling passage. A hybrid "skin core" or hybrid "skin core cooling passage" is a reference to the thin investment casting core or cores that is/are typically used to make such embedded cooling passage(s). As defined herein a hybrid skin core passage is typically a low aspect ratio cooling passage is bound by an external, hot wall on one side and at least one internal, cold wall on the opposite side. The internal wall typically segregates a hybrid skin core passage 74 and the centrally located internal core cavity 70. The internal core cavity 70 is typically bound by the first and second sides 68c/68d but may additionally or alternatively be bound by internal cold wall surfaces extending in a predominate chord wise direction between external hybrid skin core passage(s) 74 and the internal core cavity 70. One or more additional core cavities may also be located adjacent to at least one hybrid skin core passage 74, separated by a common internal cold wall on one side of the cooling passage and a hot external wall surface located on the opposite side of said main cooling passage(s) furthest from the hybrid skin core passage(s) sharing the common internal cold wall.

A typical airfoil may be formed using several investment casting cores. Each core produces a cooling passage or cavity in the airfoil, inner platform, and/or outer platform. Bleed air from the compressor is typically fed to the passages and cavities for cooling the airfoil, inner platform, and/or outer platform. Although effective for providing efficient thermal cooling, use of compressor bleed air penalizes engine thermodynamic cycle efficiency. Utilizing less compressor bleed air to cool high pressure turbine (HPT) airfoils and using it more efficiently is desirable in order to improve thermodynamic cycle efficiency, as well as, maximize turbine module aerodynamic performance. A potential solution to reducing compressor bleed cooling air flow requirements involves utilizing more efficient cooling design concepts. Turbine airfoil cooling design configurations which maximize the use and reuse of the available cooling air to provide increased convective and/or film cooling throughout more of the airfoil and platforms by fluidically connecting and coupling these cavities increases the overall thermal efficiency of the cooling configuration. A challenge to that, however, is that it can be difficult to interconnect the various passages and cavities so that the bleed air can serially flow through more of the airfoil. The investment casting cores are typically isolated from each other and consolidation of several individual cores (cooling passages) into single larger fluidically interconnected cores adds complexity and reduces manufacturability. In this regard, as will be described below in more detail, the airfoil 60 has an interconnection of several cores to provide a continuous cooling passage circuit 76 ("circuit 76") that travels circuitously through the first platform 62, the airfoil section 66, and the second platform 64.

Figure 4:
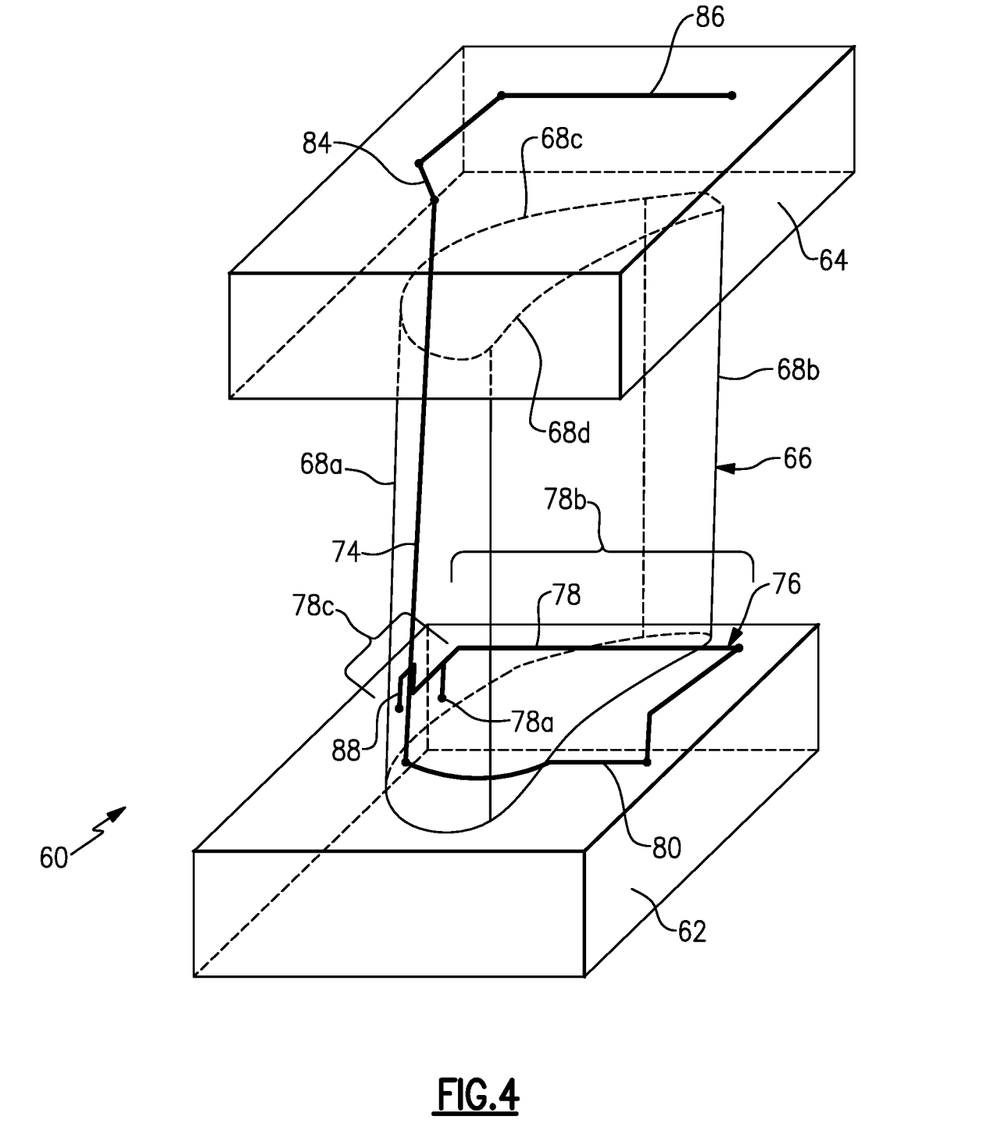
FIG. 4 illustrates a diagrammatic view of a cooling passage circuit represented as a wireframe.
Figure 5A:
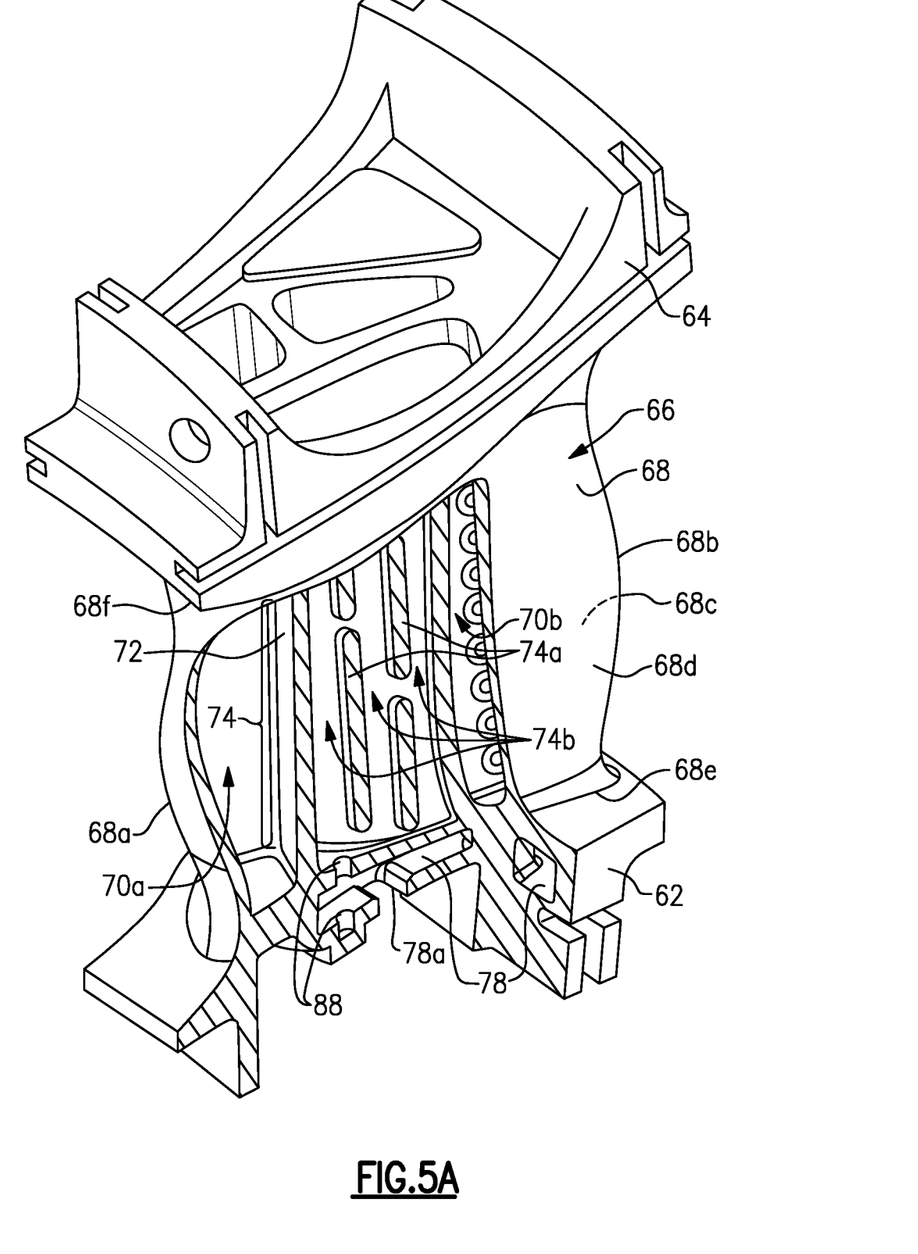
FIG. 5A illustrates a partial cutaway view of the airfoil of FIG. 2.
Figure 5B:
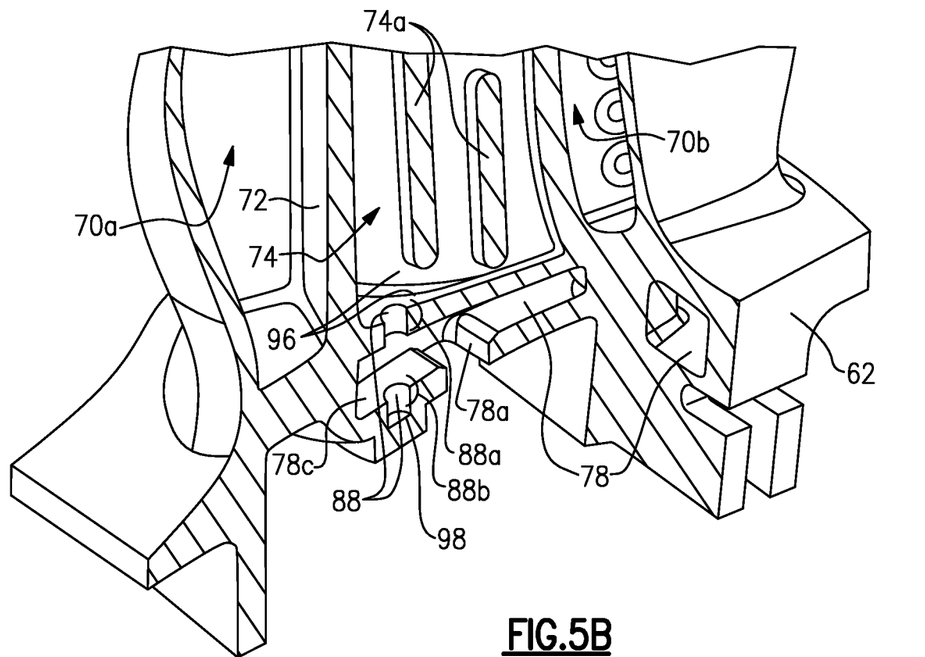
FIG. 5B illustrates a magnified view of a portion of the cutaway of FIG. 5A.
Figure 6A:
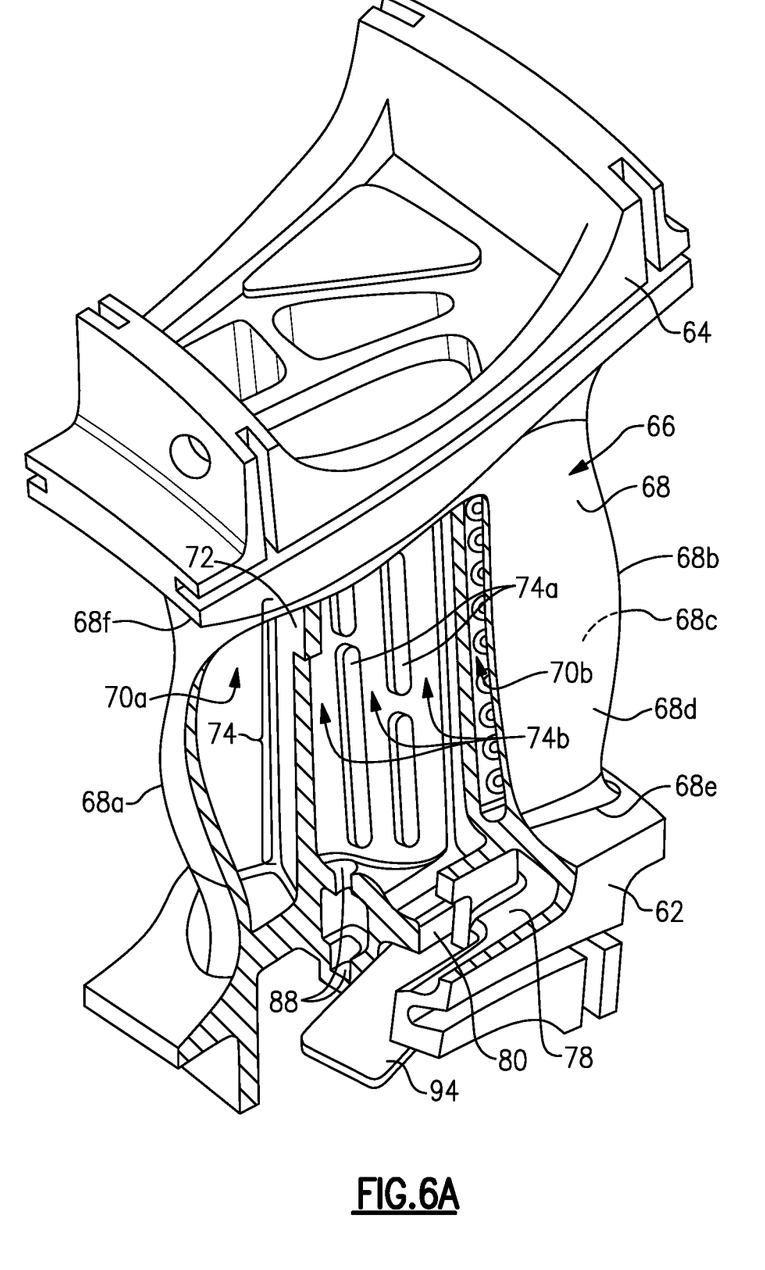
FIG. 6A illustrates another partial cutaway view of the airfoil of FIG. 2.
Figure 6B:
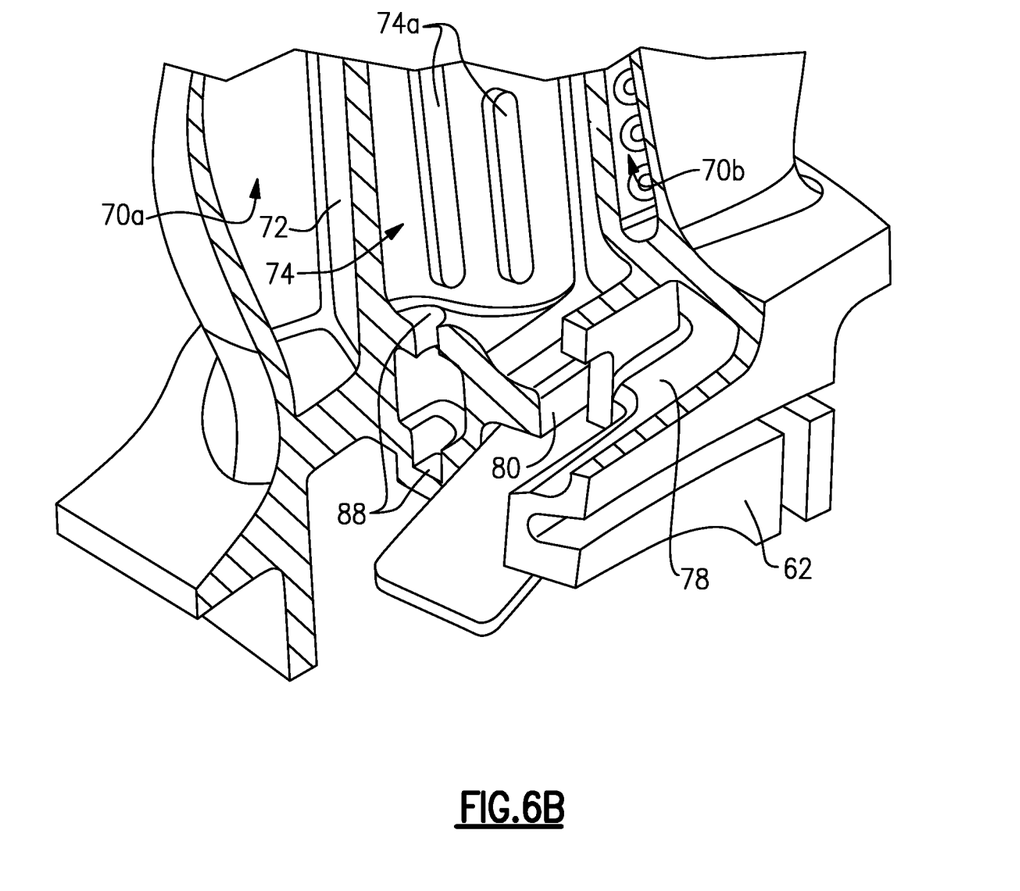
FIG. 6B illustrates a magnified view of a portion of the cutaway of FIG. 6A.

FIG. 4 depicts a diagrammatic representation of the airfoil 60. In this view the circuit 76 is represented as a wireframe in order to demonstrate examples of the various sections of the circuit 76 in the platforms 62/64 and airfoil section 66. The sections are distinct from one another are denoted by points on the wireframe, which will also be described with respect to the structures in the airfoil 60. FIGS. 5A and 6A show different partial cutaway views of the airfoil 60, and FIGS. 5B and 6B show magnified views of portions of the cutaway views of FIGS. 5A and 6A, respectively.

In general, the circuit 76 extends in the first platform 62, the airfoil section 66, and the second platform 64. In the example shown, the circuit 76 is comprised of six sections, but it is to be understood that the circuit 76 may include fewer or additional sections. In the illustrated example, the circuit 76 includes a first plenum 78, a main supply passage 80, the hybrid skin core passage 74, a connector passage 84, a second plenum 86 and a resupply passage 88. As used herein, a "plenum" refers to a passage in which the passage width and length are substantially larger than the passage thickness, such as by a factor of at least 3 or of at least 5.

The first plenum 78 is within the first platform 62 and includes an inlet 78a at which cooling air initially enters the circuit 76. The inlet 78a is adjacent the first side 68c of the airfoil section 66. In this example, the first plenum 78 also wraps around the cavity 70b. The first plenum 78 thus extends adjacent to each of the first side 68c, the trailing end 68b, and the second side 68d of the airfoil wall 68.

Figures 7, 8:
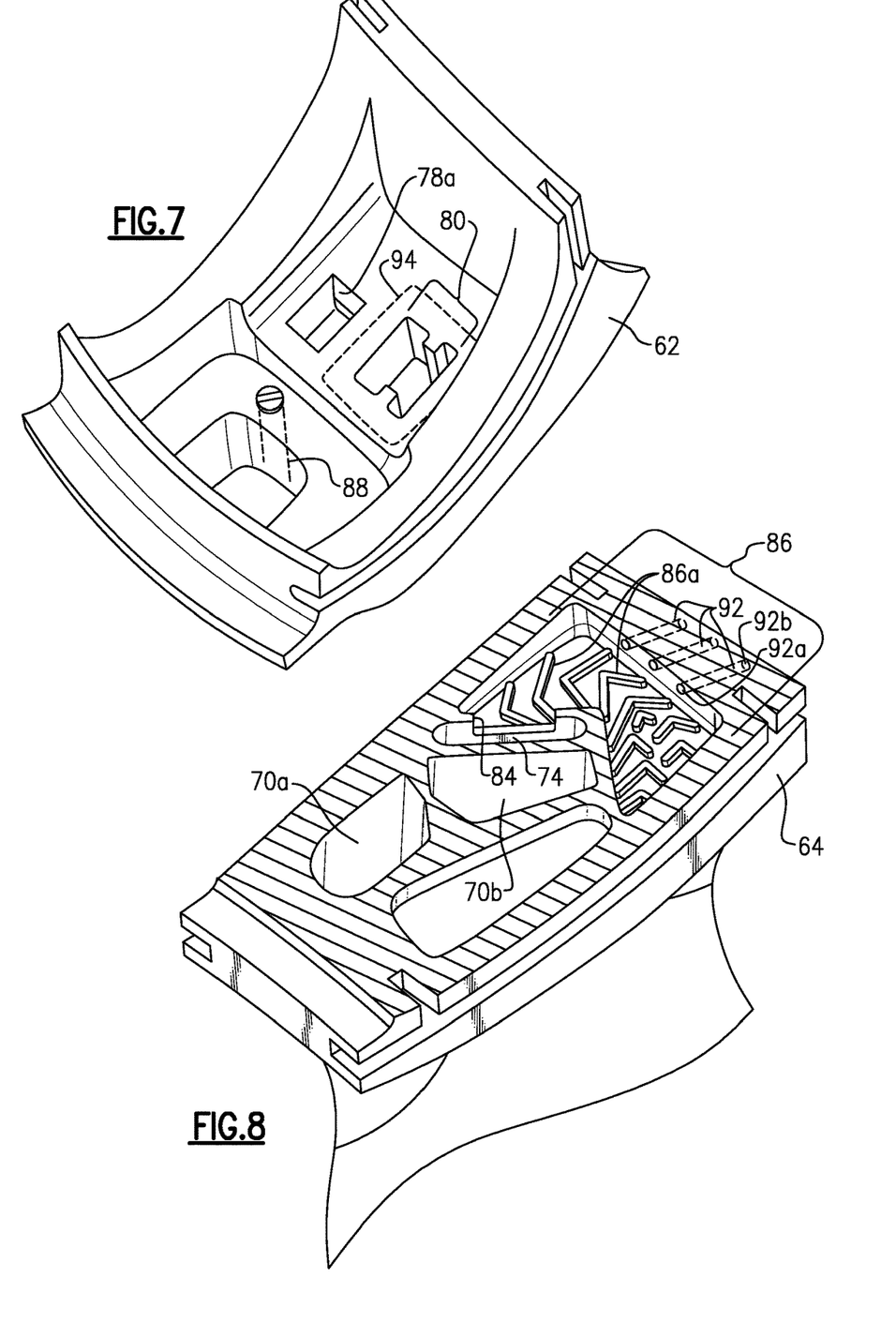
FIG. 7 illustrates a view from underneath a first platform of the airfoil of FIG. 2.
FIG. 8 illustrates a sectioned view through a second platform of the airfoil of FIG. 2.

The main supply passage 80 connects the first plenum 78 with the hybrid skin core passage 74. Portions of the inlet 78a and main supply passage 80 are also shown in FIG. 7, which is a view from underneath the first platform 62. The main supply passage 80 may be longitudinally spaced from the cavity 70b so as to extend around (e.g., under) the cavity 70b. At least a portion of the main supply passage 80 may be formed by machining and then sealed off using a cover 94 (see also FIG. 6A). The main supply passage 80 is the main source of cooling air into the hybrid skin core passage 74.

The hybrid skin core passage 74 is embedded in the first side 68c of the airfoil wall 68 and extends longitudinally. In this example, the hybrid skin core passage 74 includes a plurality of longitudinally-elongated ribs 74a that define longitudinally-elongated passages 74b there between. As shown in a sectioned view in FIG. 8, the hybrid skin core passage 74 extends into the second platform 64. The connector passage 84 connects the hybrid skin core passage 74 in the second platform 64 to the second plenum 86. The second plenum 86 is within the second platform 64 and extends adjacent to each of the first side 68c, the trailing end 68b, and the second side 68d of the airfoil wall 68. Optionally, the second plenum 86 may include heat transfer augmentation features such as trip strips 86a.

Those skilled in the art, given the benefit of this disclosure, will recognize that either or both of the first plenum 78 and the second plenum 86 may include alternate trip strip geometries which may include but are not limited to; normal, skewed, single chevron, double chevrons, discrete chevron, continuous w-shape, discrete w-shape. Additionally heat transfer augmentation devices, such as pin fins, pedestals, conical bumps, or conical dimples, elliptical divots, teardrops, etc. may also be incorporated into any of the continuous fluidically linked cooling passages through which the cooling air is transported. These heat transfer features may be used both independently and/or in conjunction with one another depending on pressure loss, heat transfer, and external heat load considerations, in order to manage and optimize cooling flow, pressure drop, cooling air temperature heat pickup and thermal cooling characteristics necessary to meet local thermal cooling effectiveness, metal temperature, and durability life requirements.

The second platform 64 may also include a plurality of orifices 92. Each orifice 92 has an inlet end 92a that opens to the second plenum 86 and an outlet end 92b that opens to an exterior of the second platform 64. The bleed air in the second plenum 86 is dumped overboard through the orifices 92. As will be appreciated, the orifices may be located on the trailing edge and/or lateral sides of the second platform 64.

As indicated above, the main supply passage 80 is the main source of cooling air into the hybrid skin core passage 74. For instance, a majority of the cooling air that enters into the hybrid skin core passage 74 flows from the inlet 78a through an aft portion 78b (FIG. 4) of the first plenum 78 that extends under the trailing end 68b of the airfoil section 66. However, the first plenum 78 also includes a forward portion or lobe 78c that leads to the resupply passage 88. The remainder of the cooling air that does not flow to the aft portion 78b flows forward through the forward portion 78c to the resupply passage 88 and into the hybrid skin core passage 74.

The cooling air entering the hybrid skin core passage 74 via the resupply passage 88 is at approximately equivalent pressure as the inlet 78a and is at a lower temperature than the cooling air entering via the main supply passage 80, which has by that point already adsorbed heat from the first platform 62 along the aft portion 78b.

Additionally, the flow area size, shape, and orientation of the resupply passage 88 can be tuned and optimized to enhance convective cooling characteristics that are provided by the cooling air emanating from the resupply passage 88.

The resupply passage 88 may be of constant, converging, or diverging cross sectional area along the streamwise direction of the cooling air flow within the resupply passage 88. The resupply passage 88 may comprise of varying geometry shapes that include, but are not limited to; circular, cylindrical, racetrack, and/or elliptical geometries. Additionally, the resupply passage 88 may also include varying convex and/or concave surfaces, and/or aspect ratios in order to minimize momentum mixing losses that may occur either within the hybrid skin core passage 74, and/or between the two separate cooling flows emanating from the main supply passage 80 and the resupply passage 88. By tailoring the geometry of the resupply passage 88, the internal pressure, temperature, and cooling air flow distribution within the hybrid skin core passage 74 may be better distributed and optimized in order to maximize local internal convective heat transfer characteristics relative to the variations in the local external heat flux in order to improve part durability and life capability, The geometry of the forward portion 78c of the first plenum 78 may also tailored to reduce mass and heat load in the first platform 62 in order to reduce local thermal mechanical strain and improve thermal mechanical fatigue (TMF) capability.

Figure 9:
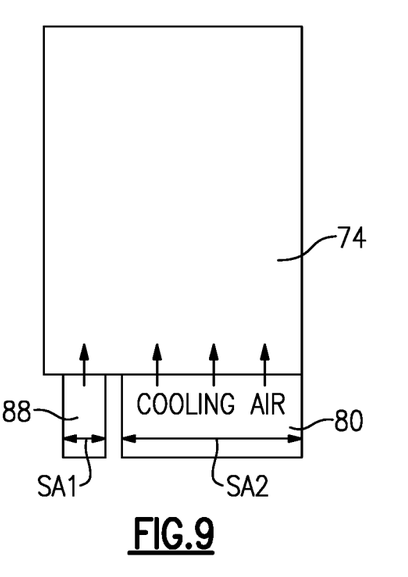
FIG. 9 illustrates a schematic view of a hybrid skin core passage, main supply passage, and resupply passage.

As shown schematically in FIG. 9, the resupply passage 88 has a first cross-sectional area, represented at SA1, and the main supply passage 80 has a second cross-sectional area, represented at SA2. Although the cross-sectional areas SA1 and SA2 are represented schematically, it is to be understood that the areas SA1 and SA2 embody the area, such as the width times the height, of a section taken through the passages 80 and 88. The area SA2 is larger than the area SA1. For example, the area SA2 may be larger than the area SA1 by a factor of at least two, but more typically will be larger by a factor of at least three or at least five, up to a factor of about 30.

The resupply passage 88 extends longitudinally and opens into a forward portion 96 of the hybrid skin core passage 74, adjacent the rib 72. For instance, the forward portion 96 is the forward one-fourth of the hybrid skin core passage 74 relative to the distance from a forward edge to a trailing edge of the hybrid skin core passage 74. The main supply passage 80 opens into the hybrid skin core passage 74 aft of the resupply passage 88. Since the relative location of the main supply passage 80 is positioned toward the aft or rearward portion of the hybrid skin core passage 74, the forward portion 96 of the hybrid skin core passage 74 may experience lower cooling air flow rates from the main supply passage 80. In this regard, the resupply passage 88 serves as a fluidic conduit, by providing additional cooling air flow to a low-flow, low-velocity region of the hybrid skin core passage 74 that would otherwise exhibit low convective heat transfer and poor thermal cooling effectiveness characteristics.

The circuit 76 may be formed, in part, by investment casting cores and machining operations. For example, cores may be used to form the first plenum 78, the hybrid skin core passage 82, and the second plenum 86, while at least portions of the passages 80/84 may be formed by machining operations. For instance, there may initially be a wall at the entrance of the main supply passage 80 after casting. A portion of this wall may be machined to provide an opening from the first plenum 78. A remaining portion of the main supply passage 80 may be formed by the same core that is used to form the hybrid skin core passage 74. Similarly, there may initially be a wall in the second platform 64 between the hybrid skin core passage 74 and the second plenum 86. The wall may be machined to form a portion of or all of the second connector passage 84. To allow access for such machining operations, the platforms 62/64 may be cast with open or partially open faces. After the machining operations, covers 94 may be attached, such as by welding, over the faces. For instance, the cover 94 on the first platform 62 encloses the main supply passage 80 and a portion of the first plenum 78, and the cover 94 on the second platform 64 encloses the second connector passage 84 and a portion of the second plenum 86.

The resupply passage 88 may also be formed and fabricated by silica and/or alumina ceramic core material, and/or at least partially, by machining. For instance, the resupply passage 88 is an aperture that is drilled into the first platform 62. In this regard, as shown in FIG. 5B, the aperture may include a first resupply passage portion 88a and a second resupply passage portion 88b. The first and second resupply passage portions 88a/88b "straddle" the forward portion 78c of the first plenum 78. During machining, the aperture is drilled from the bottom of the first platform 62 to first form the second resupply passage portion 88b. The second resupply passage portion 88b intersects the forward portion 78c of the first plenum 78 and provides access for continued drilling on the outer side of the first plenum 78 to form the first resupply passage portion 88a. After completion of the drilling, a cover or plug 98 may be inserted into the second resupply passage portion 88b to form a blind aperture so that cooling air flowing in the forward portion 78c is directed into the first resupply passage portion 88a and then into the hybrid skin core passage 74.

The resupply passage 88 comprising of apertures 88a and 88b may be of the same and/or different cross sectional area and/or shape and size. The relative cross sectional flow areas of apertures 88a and 88b may differ depending on pressure and/or cooling flow, pressure loss, and heat transfer requirements. It should be recognized by those skilled in the art that the tailoring of the apertures 88a and 88b may be driven by manufacturing methods, and/or core producibility considerations, as well as, thermal cooling effectiveness and heat transfer characteristics necessary to achieve part functionality and durability life objectives.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. An airfoil comprising:
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
first and second platforms attached, respectively, with the first and second ends;

a cooling passage circuit extending at least in the first platform and the airfoil section, the cooling passage circuit including a first plenum in the first platform, the first plenum having an inlet adjacent the first side for receiving a supply of cooling air, an aft portion extending from the inlet and wrapping around the internal core cavity so as to extend adjacent to each of the first side, the trailing end, and the second side of the airfoil wall, and a forward lobe extending from the inlet, a skin core passage embedded in the first side of the airfoil wall and extending longitudinally a main supply passage in the first platform and longitudinally spaced from the internal core cavity so as to extend under the internal core cavity and connect the first plenum with the skin core passage to provide a main supply of the cooling air into the skin core passage from the first plenum, and a secondary supply passage connecting forward lobe of the first plenum with the skin core passage to thereby provide additional cooling air to the skin core passage.

2. The airfoil as recited in claim 1, wherein the secondary supply passage opens into a forward portion of the skin core passage.

3. The airfoil as recited in claim 1, wherein the secondary supply passage opens into a forward one-fourth of the skin core passage.

4. The airfoil as recited in claim 1, wherein the secondary supply passage opens longitudinally.

5. The airfoil as recited in claim 1, wherein the secondary supply passage includes a first secondary supply passage portion that opens to the skin core passage and a second secondary supply passage portion that includes a blind aperture.

6. The airfoil as recited in claim 5, wherein the first secondary supply passage portion and the second secondary supply passage portion straddle a portion of the first plenum.

7. The airfoil section as recited in claim 1, wherein the secondary supply passage is adjacent a rib in the airfoil section.

8. The airfoil as recited in claim 1, wherein the secondary supply passage has a first cross-sectional area and the main supply passage has a second cross-sectional area that is greater than the first cross-sectional area.

9. The airfoil as recited in claim 1, wherein the cooling passage circuit includes a second plenum in the second platform and a connector passage connecting the skin core passage with the second plenum.

10. The airfoil as recited in claim 1, wherein the skin core passage includes a plurality of longitudinally-elongated ribs that define longitudinally-elongated passages there between.

11. The airfoil as recited in claim 1, wherein the first side is a suction side and the second side is a pressure side.

12. The airfoil as recited in claim 1, wherein the first platform includes a welded cover that encloses the main supply passage.

13. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity,
first and second platforms attached, respectively, with the first and second ends, and a cooling passage circuit extending at least in the first platform and the airfoil section,
the cooling passage circuit including
a first plenum in the first platform, the first plenum having an inlet adjacent the first side for receiving a supply of cooling air, an aft portion extending from the inlet and wrapping around the internal core cavity so as to extend adjacent to each of the first side, the trailing end, and the second side of the airfoil wall, and a forward lobe extending from the inlet,
a skin core passage embedded in the first side of the airfoil wall and extending longitudinally,
a main supply passage in the first platform and longitudinally spaced from the internal core cavity so as to extend under the internal core cavity and connect the first plenum with the skin core passage to provide a main supply of the cooling air into the skin core passage from the first plenum, and
a secondary supply passage connecting the first plenum with the skin core passage to thereby provide additional cooling air to the skin core passage.

14. The gas turbine engine as recited in claim 13, wherein the secondary supply passage opens into a forward portion of the skin core passage.

15. The gas turbine engine as recited in claim 13, wherein the secondary supply passage opens into a forward one-fourth of the skin core passage.

16. The gas turbine engine as recited in claim 15, wherein the secondary supply passage opens longitudinally.

17. The gas turbine engine as recited in claim 13, wherein the secondary supply passage has a first cross-sectional area and the main supply passage has a second cross-sectional area that is greater than the first cross-sectional area.

18. The gas turbine engine as recited in claim 13, wherein the secondary supply passage includes a first secondary supply passage section that opens to the skin core passage and a second secondary supply passage.

19. The gas turbine engine as recited in claim 13, wherein the secondary supply passage is adjacent a rib in the airfoil section.

20. The gas turbine engine as recited in claim 13, wherein the cooling passage circuit includes a second plenum in the second platform and a connector passage connecting the skin core passage with the second plenum, the skin core passage includes a plurality of longitudinally-elongated ribs that define longitudinally-elongated passages there between, and the first side is a suction side and the second side is a pressure side.

* * * * *